United States Patent Office 3,403,987
Patented Oct. 1, 1968

3,403,987
METHOD FOR THE PREPARATION OF NITRONIUM SALTS
Stephen J. Kuhn, Sarnia, Ontario, Canada, assignor to The Dow Chemical Company, Midland, Mich., a corporation of Delaware
No Drawing. Filed Sept. 20, 1961, Ser. No. 139,374
5 Claims. (Cl. 23—356)

This invention is concerned with nitronium salts and more particularly is concerned with a new method for the preparation of solid nitronium salts.

The existence and characteristics of solid nitronium salts such as nitronium tetrafluoroborate, nitronium hexafluorophosphate, dinitronium hexafluorosilicate and nitronium hexafluoroantimonate for example have been known for some time.

These salts at present ordinarily are prepared by one of the following techniques: (1) Nitrogen peroxide ($NO_2$) together with bromine trifluoride ($BrF_3$) acts on a suitable material such as a metal, oxide, oxy-salt or halide which is capable of reacting on the bromine trifluoride either as a Lewis acid or base. [Woolf and Emeleus, J. Chem. Soc., 1050 (1950)]; (2) Preparation of nitryl fluoride ($NO_2F$) and subsequent reaction of this compound with a suitable Lewis acid, e.g., a non metal non-metallic fluoride, [Anysley, Hetherington and Robinson, J. Chem. Soc., 119 (1954)]; and (3) Adding a mixture of anhydrous hydrofluoric acid and an appropriate fluoride compound to a preparation of dinitrogen pentoxide ($N_2O_5$) dissolved in nitromethane [Schmeisser and Elisher, Z. Naturforsch., 7b, 583 (1952)].

All of these listed processes for the preparation of solid nitronium salts suffer from one or more of the following defects and/or difficulties. The operations are multi-step. Nitrogen oxide based starting materials, e.g. $N_2O_5$ and $NO_2F$ are both expensive and not readily commercially available. The resulting nitronium salts are relatively impure. Complicated reactor equipment is needed and the reactions are both difficult and somewhat dangerous to carry out.

It is a principal object of the present invention, therefore, to provide a new and novel process for the preparation of solid nitronium salts.

It is an additional object of the present invention to provide a safe, straight-forward method for the preparation of high purity, solid nitronium salts which permits the use of readily available commercial materials as reactants.

It is a further object of the present invention to provide a method for preparing solid nitronium salts which does not require complicated reaction apparatus nor the prior preparation of either nitryl fluoride or nitrogen pentoxide.

These and other objects and advantages will become apparent from the detailed description of the method of the instant invention presented hereinafter.

In accordance with the method of the present invention, an acid substance is introduced into a solution of nitric acid and anhydrous hydrogen fluoride or into a solution of these compounds carried in nitromethane and the reaction mixture is agitated while being maintained at a temperature ranging from about 30° below zero centigrade to about 20° above zero centigrade. The resulting nitronium salt product, which precipitates during the course of the reaction then can be separated from the reaction mixture. The term "fluoride acid substance" or fluoride "acid" as used hereinafter refers to those fluorine-containing materials capable of accepting a pair of electrons in the formation of a bond as set forth by the Lewis theory of acids and bases.

Ordinarily, in the instant method, the nitric acid and hydrogen fluoride will be carried in a nitromethane solvent. However, use of this compound is not essential as an excess of the anhydrous hydrogen fluoride itself can be used as a solvent for the reactants. This latter material is used as solvent particularly with those reactants which undergo reaction with nitromethane, e.g. antimony pentafluoride.

Preferably, the Lewis acid substance which reacts with the nitronium ion to form the salt will be a fluoride compound and ordinarily will be a polyfluoride compound of general formula $MF_n$ wherein the second member M is a metal, metalloid or non-metallic species selected from Groups III to VII inclusive of the periodic table and $n$ is an integer equal to the valence state of the substance M in the polyfluoride. Examples of a few useful Lewis acid nitronium salt formers are; boron trifluoride ($BF_3$), phosphorus pentafluoride ($PF_5$), silicon tetrafluoride ($SiF_4$), antimony pentafluoride ($SbF_5$), stannic tetrafluoride, ($SnF_4$), iodine pentafluoride ($IF_5$) and the like.

Both dilute and concentrated nitric acid solutions can be used in the present method. However, concentrated nitric acid assaying from about 90 to about 100 percent $HNO_3$ is preferred. At the lower $HNO_3$ concentration satisfactory reaction is achieved, but excessive amounts of the Lewis acid fluoride must be added. Much of the excess fluoride is consumed by side reactions and lost, i.e. it does not appear in the desired nitronium salt.

The anhydrous hydrogen fluoride to be used preferably is selected from those substantially anhydrous materials which assay from about 98 to about 100 percent hydrogen fluoride.

In actual operation of the process, the relative proportion of nitric acid to anhydrous hydrogen fluoride in the initial solution will range from about 1/1 to about 1/4 on a molar basis. Ordinarily, reaction mixtures utilizing the larger ratios of hydrogen fluoride to nitric acid will be those wherein the nitromethane solvent is not employed. The ratio of the Lewis acid to the nitric acid will range from about 1/1 to about 3/1 of the stoichiometric molar quantities needed for salt production.

Preferably equimolar amounts of a concentrated nitric acid and hydrogen fluoride will be used. Also, substantially twice the stoichiometric molar equivalent of the Lewis acid to the nitric acid, based on the amount of nitronium ion ($NO_2^+$), preferably will be employed. This excess quantity of Lewis acid is desired since a portion of the Lewis acid will react with water formed during the reaction.

The amount of either nitromethane or excess hydrogen fluoride solvent to be used is not critical. Generally, the amount of solvent utilized will be up to about 150 grams per mole of the reactants present.

The upper operative limit of temperature is the boiling point of the hydrogen fluoride, about 20° centigrade at atmospheric pressure, and the lower limit is the freezing point of the reaction mixture, i.e. from about 30 to about 40° below zero centigrade. A preferred operating temperature range is from about 20° below zero centigrade to about 0° C.

The reaction time is not critical as the nitronium salt precipitates almost instantaneously as the Lewis acid contacts the nitric acid-hydrogen fluoride mixture. A smooth reaction which gives control of a preselected operating temperature is obtained if the Lewis acid is introduced slowly and controllably into the nitric acid-hydrogen fluoride while the entire reaction mass is being agitated. Such agitation can be carried out using manual, mechanical, electrical or magnetic stirring or by other conventional mixing techniques.

The process can be carried out in reactor vessels or flasks of silica, polyethylene, stainless steel or other materials which do not undergo a prohibitive amount of corrosive attack in the presence of the reactants. Control of the reaction temperature within the desired limits can be achieved through the use of a reactor with integral cooling means or by coupling an external cooling means to a given reactor.

The nitronium salts as produced are white solids and are of a high purity. These can be removed from the reaction mixture by conventional means such as filtration, centrifugation and the like, and then dried directly. However, if desired, the separated salts can be washed with a small amount of nitromethane to promote further the removal of reaction impurities therefrom and any residual wash material then simply be removed under reduced pressure. Also low boiling inert diluents such as certain of the Freons (trademarked product of E. I. du Pont Co.) can be used as a wash to facilitate the subsequent drying of the salts.

The salts find use as oxidizers in high energy fuels. Additionally, these can be used as nitrating agents for aromatic organic compounds especially if anhydrous media are required for the nitrations. Also, they may be used as oxidizers in a number of reactions replacing the conventional oxidizers now being used.

The following examples will serve to further illustrate the method of the present invention but are not meant to limit it thereto.

Example 1

Into a solution comprised of about 1 mole of nitric acid ($HNO_3$ assay 90–100 percent) and about 1 mole of substantially anhydrous hydrogen fluoride in about 150 grams of nitromethane there was added slowly with stirring about 2 moles of boron trifluoride, the temperature being maintained at about minus 5° centigrade. As this addition was being made, a white solid precipitate of nitronium tetrafluoroborate $(NO_2)BF_4$ precipitated in the reaction flask. After the boron trifluoride addition was complete, the stirring was continued for a short while. The white solid precipitate then was filtered from the reaction solution and the separated salt washed with a small amount of nitromethane. An additional washing with a small amount of Freon 113 (a trademarked product of E. I. du Pont Co.) was then employed. This step was included merely to facilitate drying of the salt since the Freon has a lower boiling point (44° C.) than does nitromethane. This product was dried by removing the wash material under reduced pressure.

Infrared spectrum analysis of this product was identical with that of a carefully purified nitronium tetrafluoroborate prepared by a conventional method.

Chemical analysis of the salt showed a nitrogen content of 10.45 percent. Calculated nitrogen value for the pure salt is 10.5 percent.

Example 2

Using the same technique and molar equivalent ratios of reactants as described above, phosphorous pentafluoride ($PF_5$) was added to the nitric acid-hydrogen fluoride-nitromethane solution. The subsequent reaction gave a high purity, white nitronium hexafluorophosphate, $(NO_2)PF_6$.

Example 3

One mole of silicon tetrafluoride was added to a solution containing 1 mole of nitric acid (90–100 percent $HNO_3$), 1 mole of substantially anhydrous hydrogen fluoride acid and about 100 grams of nitromethane according to the procedure described in Example 1.

A white solid dinitronium hexafluorosilicate salt $(NO_2)_2SiF_6$, of high purity was produced.

Example 4

One and a half moles of antimony pentafluoride were added to a solution containing 1 mole of nitric acid (90–100 percent $HNO_3$) and 3 moles of anhydrous hydrogen fluoride utilizing the experimental technique described in Example 1. The resulting white solid nitronium hexafluoroantimonate, $(NO_2)SbF_6$, was of high purity as produced.

In a manner similar to that described for the foregoing experiments, nitronium tetrafluoroaurate $(NO_2)AuF_4$ can be produced by reacting substantially stoichiometric quantities of auric fluoride with concentrated nitric acid in the presence of hydrogen fluoride and nitromethane at a temperature of about 10° C. Nitronium pentafluoroselenate, $(NO_2)SeF_5$ can be produced using dilute nitric acid-anhydrous hydrogen fluoride-nitromethane and adding a molar excess, based on stoichiometry, of selenium tetrafluoride thereto at a temperature of about minus 10° centigrade. Also, nitronium hexafluoroiodate, $(NO_2)IF_6$, can be formed by adding iodine pentafluoride to a solution of concentrated nitric acid and anhydrous hydrogen fluoride.

Further, dinitronium hexafluorogermanate, $$(NO_2)_2GeF_6$$

dinitronium hexafluorostannate, $(NO_2)_2SnF_6$; nitronium hexafluoroarsenate, $(NO_2)A_5F_6$ and the like all can be prepared by the method of the instant invention.

Various modifications can be made in the present invention without departing from the spirit or scope thereof for it is understood that I limit myself only as defined in the appended claims.

I claim:
1. A process for the preparation of nitronium salts which comprises: introducing a fluorine containing Lewis acid substance into a solution of nitric acid and substantially anhydrous hydrogen fluoride while maintaining the temperature of the reaction mixture between about 20° C. and the freezing point of the mixture, agitating said solution during the introduction of said Lewis acid substance therein, and, precipitating the nitronium salt corresponding to the Lewis acid substance directly in the reaction mixture, said Lewis acid substance being a fluoride compound selected from the group consisting of boron trifluoride, phosphorus pentafluoride, silicon tetrafluoride, antimony pentafluoride, stannic tetrafluoride and iodine pentafluoride, said solution of nitric acid being concentrated with respect to $HNO_3$, the relative proportion of said nitric acid to said hydrogen fluoride in the initial reaction solution ranging from about 1/1 to about 1/4 on a molar basis and the ratio of said Lewis acid to said nitric acid ranging from about 1/1 to about 3/1 of the stoichiometric molar quantities needed for salt production.

2. The process as defined in claim 1 wherein there is incorporated the additional step of separating the precipitated nitronium salt from the reaction mixture.

3. A process for the preparation of nitronium salts which comprises: introducing a Lewis acid fluoride compound into a solution of nitric acid and substantially anhydrous hydrogen fluoride dissolved in a solvent selected from the group consisting of nitromethane and excess hydrogen fluoride while maintaining the reaction temperature between about 20° above zero centigrade and 40° below zero centigrade, continuously agitating the reaction mixture while adding the Lewis acid fluoride compound to the said solution, and, precipitating the solid nitronium salt of the Lewis acid fluoride directly in the reaction mixture, said Lewis acid fluoride compound being a member selected from the group consisting of boron trifluoride, phosphorus pentafluoride, silicon tetrafluoride, antimony pentafluoride, stannic tetrafluoride and iodine pentafluoride, said fluoride not reacting with said nitromethane, said solution of nitric acid being concentrated with respect to $HNO_3$, the relative proportion of said nitric acid to said hydrogen fluoride in the initial reaction solution ranging from about 1/1 to about 1/4 on a molar basis and the ratio of said Lewis acid fluoride to said nitric acid ranging from about 1.5/1 to about 2/1 of the stoichiometric molar quantities needed for production of said nitronium salt.

4. The process as defined in claim 3 wherein the concentration of the nitric acid is at least 90 percent $HNO_3$ wherein substantially stoichiometric molar quantities of said nitric acid and the hydrogen fluoride are employed and about a two fold stoichiometric molar excess of the Lewis acid to said nitric acid as required for nitronium salt formation is employed.

5. The process as defined in claim 3 wherein there is incorporated the additional step of separating the precipitated nitronium salt from the reaction mixture.

References Cited

UNITED STATES PATENTS 3,092,459   6/1963   Cleaver _____ 23—203

OTHER REFERENCES

Remy—"Treatise On Inorganic Chemistry"—1956, vol. I, pp. 599–601, 622.

Maddock et al.—"Recent Aspects of The Inorganic Chemistry Of Nitrogen"—1957, Special Publication No. 10 of The Chemistry Society: London, pp. 23, 25–32.

Hetherington et al.—"Nitryl Fluoride and Nitronium Compounds"—Recent Aspects of the Inorganic Chemistry of Nitrogen. The Chemical Society, London, 1957, p. 24

Luder et al.—"General Chemistry"—Published by W. B. Saunder Co., London, 1953, pp. 359–360.

MILTON WEISSMAN, *Primary Examiner.*